Jan. 12, 1932.    E. J. NICHOLSON    1,841,294
BRAKE
Filed April 2, 1929    2 Sheets-Sheet 2
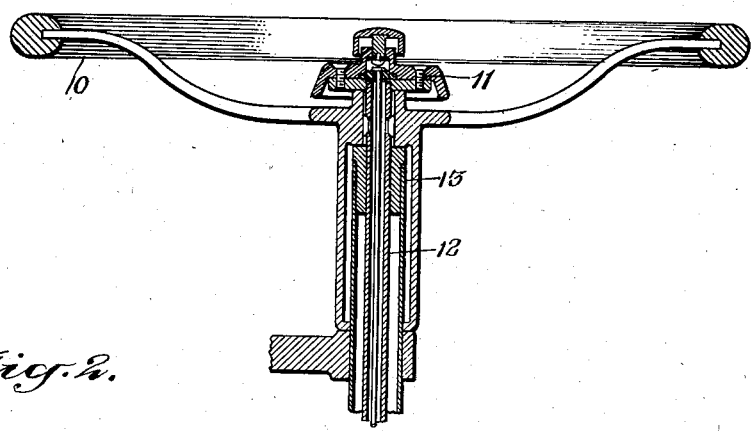
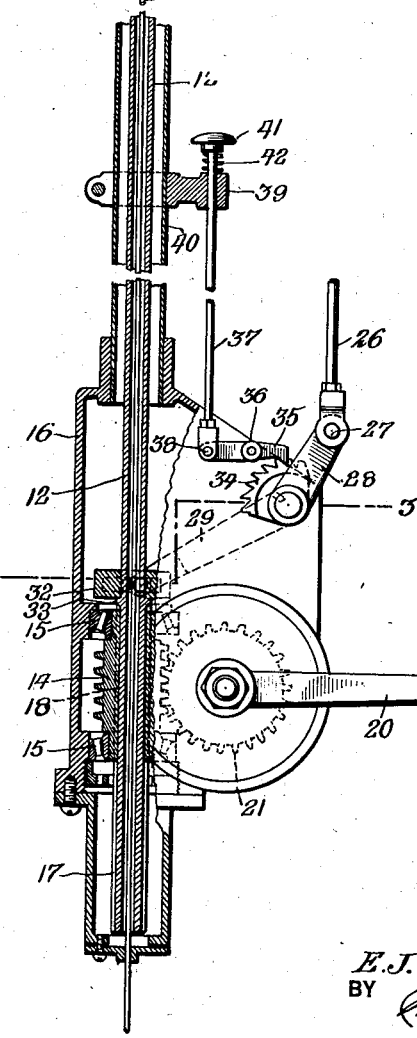
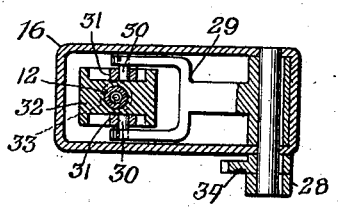
Fig. 2.
Fig. 3.
WITNESSES
INVENTOR
E. J. Nicholson
BY
ATTORNEYS Patented Jan. 12, 1932

1,841,294

UNITED STATES PATENT OFFICE

EARLE J. NICHOLSON, OF SYRACUSE, NEW YORK

BRAKE

Application filed April 2, 1929. Serial No. 351,939.

This invention relates to an improvement in an automobile, designed and adapted to enable a driver to quickly, easily and effectually put the automobile under control in traffic emergencies arising while driving the automobile.

In its broadest aspect the invention contemplates the provision of a novel emergency brake control means, to supplant those now in general use on automobiles.

It is well known that a driver of an automobile, when in a traffic situation requiring an immediate stop, instinctively pushes both the clutch and brake pedals firmly down, and at the same time pulls upwardly on the steering wheel. By so doing the driver is able to get increased leverage for pushing downwardly on the pedals. In the event of failure of the foot brake mechanism to operate effectively, the driver reaches around blindly for the hand or emergency brake lever, and so loses valuable time, and may be too late to avoid a collision.

It is therefore the principal object of the present invention to overcome the above mentioned disadvantages, by the provision of means to enable a driver to have control over the emergency brakes without removing the hands from the steering wheel.

With the foregoing and other objects in view, the invention resides in the particular construction, operation and combinations of parts, hereinafter fully described and illustrated in the accompanying drawings in which—

Fig. 2 is a sectional view, partly in elevation of the steering mechanism and also showing cooperating parts of the brake mechanism.

Fig. 3 is a detail section taken on the line 3—3 of Fig. 2.

Figure 1:
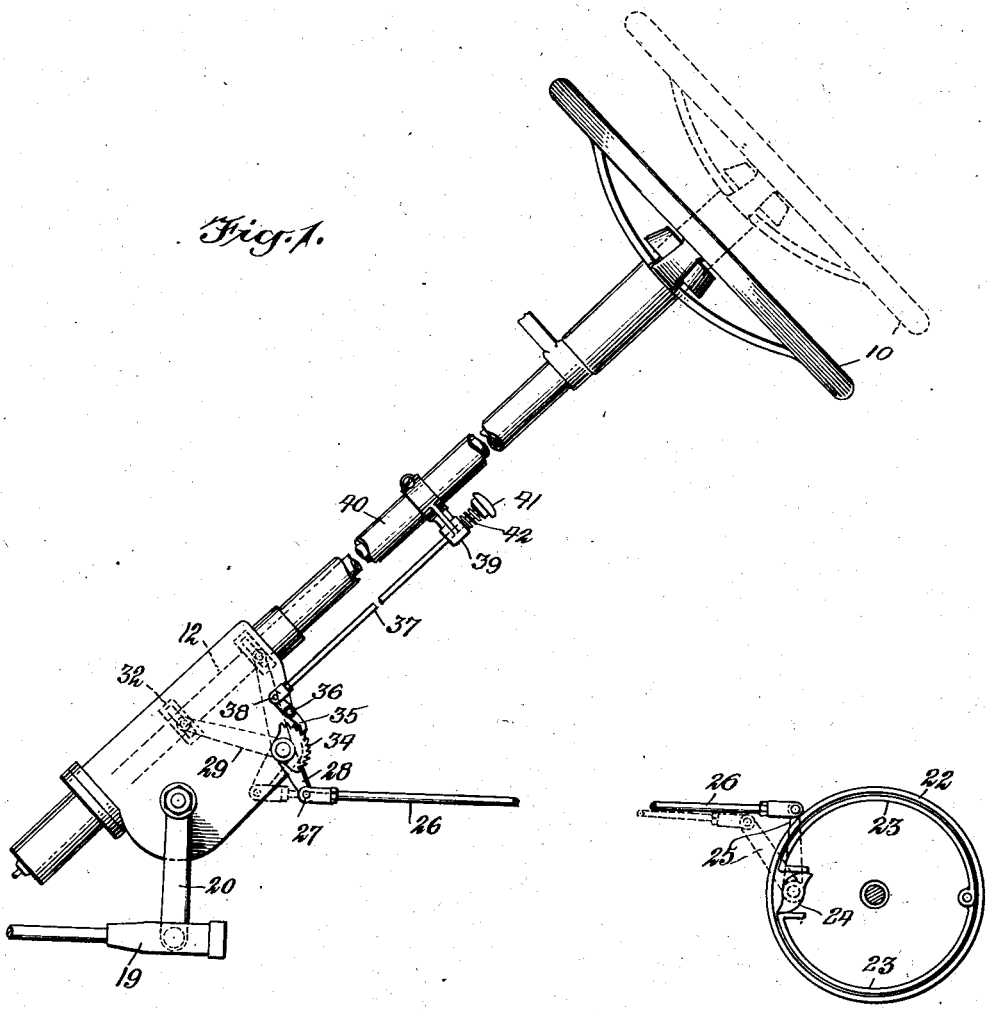
Figure 1 is a diagrammatic side view of certain parts of an automobile steering mechanism, and also of parts of an emergency brake mechanism constructed to operate in accordance with the invention, portions broken away.

Broadly stated, the invention consists of the combination of an automobile steering mechanism of any preferred type modified to allow the steering wheel to have movement other than rotatory movement, with any preferred type of brake mechanism, preferably including an emergency brake operable by the movement of the steering wheel to operate the brake.

Referring now more particularly to the drawings it will be apparent that there has been shown parts of a steering mechanism including a steering wheel 10 secured as at 11 to the upper end of a steering post 12. The post 12 in the present instance beside having rotatory movement also has axial movement in a bushing 13 and a worm 14. The worm 14 is supported for rotatory movement in the usual manner by ball thrust bearings 15 arranged in a housing 16. The lower end of the post 12 is provided with a longitudinal groove 17 which receives a spline or key 18 on the worm 14 in order to allow the post 12 to move axially with respect to the worm 14 and also to cause said worm 14 to turn with the post 14, for the purpose of transmitting motion to a drag link 19 through the intervention of a steering arm 20 connected with the shaft of a worm wheel 21 arranged within the housing 16. The construction and operation thus far described is well known, with the exception of the mounting of the post 12 for axial movement.

The brake mechanism, as stated may be of any preferred construction but which preferably will include an emergency brake of the internal expansion type including a drum 22, shoes 23, and a cam 24 which acts on the abutments of the shoes 23 to force them into contact with the interior surface of the drum 22 for the purpose of applying or setting the brake. The cam 24 is operated by a lever 25 having operatively connected therewith linkage or a rod 26 and retractile spring means, not shown. The rod 26 is pivotally connected as at 27 with a rock lever 28 supported by the housing 16. The lever 28 has a bifurcated arm 29 disposed within the housing 16. The furcations of the arm 29 are each pivotally connected as at 30 with a block 31 slidably arranged on a collar 32 arranged for sliding movement on the post 12. The post 12 has a shoulder 33 which is positioned to encounter the collar 32 for a purpose to appear. It will now be understood that when the steering wheel 10 is moved axially upward, similar movement will be imparted to the steering post 12. This axial movement of the steering post 12 will bring the shoulder 33 into engagement with the collar 32 causing the latter to move with the post 12. This movement of the collar 32 with the post 12 causes movement of the lever 28 in one direction and through the intervention of the linkage or rod 26, lever 25 and cam 24, the shoes 23 will be brought into braking engagement with the drum thereby stopping rotation thereof for the obvious purpose.

In order that the brake may be set when it is desired to park the automobile there is provided holding and releasing means operable in conjunction with the rock lever 28. The said means includes a ratchet sector 34 movable with the lever 28. A pawl 35 pivotally mounted as at 36 on the housing coacts with the teeth of the sector 34 when the pawl is in its normal position. A rod 37 is pivotally connected as at 38 with the pawl 35, and said rod extends through a bearing 39 carried by the post tube 40 of the steering column. The rod 37 has a button 41. A coil spring 42 surrounds the rod 37 and has one end thereof in contact with the bearing 39 and its opposite end in contact with the button 41. It will now be understood that when the rock lever 28 is moved for the purpose of applying the brake, the pawl 35 will automatically engage one of the teeth of the sector 34, and in this manner the brake will be set. When it is desired to release the brake, the button 41 which will be accessible to the foot of the driver may be given a slight pressure with the toe of the foot against the action of the spring 42 which will disengage the pawl 35 thereby releasing the brake. It will be obvious that by providing a loose spline or key connection between the steering post 12 and the worm 14, steering safety will not be sacrificed, and that it will be possible to carry out steering operations at all times regardless of the position of the steering wheel 10, which in practice will be allowed to move axially four or five inches. It will also be apparent that the steering wheel and therefore the post 12 may be moved downwardly without causing a similar movement to the collar 32. When the brake is released, the collar 32 will be brought into engagement with the shoulder 33 on the post 12 by the action of the brake mechanism.

It is to be understood that the invention is not restricted to the precise arrangement of parts shown and described, as details of construction may be modified and rearranged without departing from the spirit of the invention, the scope of which is limited only by the terms of the appended claims.

I claim:

1. In a vehicle brake mechanism the combination of an emergency brake, a service member, a shaft having longitudinal movement, a block movable with and with respect to said shaft, a lever having sliding connection with said block, and linkage between the lever and brake, said service member being connected with said shaft to cause longitudinal movement thereof, to cause the movement of said block, lever and linkage, to operate the brake.

2. The combination with a vehicle wheel emergency brake, of steering mechanism including a post having axial movement, and a steering wheel secured to said post; a block movable with and with respect to said post, a lever having sliding connection with said block, and linkage connected with the lever and brake, said post being moved axially by a pulling force applied to the steering wheel, thereby causing the movement of the block, lever and linkage, and consequent operation of said brake.

3. The combination with a vehicle wheel emergency brake, of steering mechanism including a post having axial movement, and a steering wheel secured to said post; a block movable with and with respect to said post, a lever having sliding connection with said block, and linkage connected with the lever and brake, said post being moved axially by a pulling force applied to the steering wheel, thereby causing the movement of the block, lever and linkage, and consequent operation of said brake, and foot releasable means which cooperates with said lever to keep the brake applied.

4. The combination with a vehicle wheel brake, of a vehicle steering mechanism including a steering post having axial movement, and a steering wheel secured to said post; a block loosely mounted on said post but movable with the post when the latter is moved axially in one direction, and means operable by the movement of said block as the latter moves with post when the post is moved axially in one direction by a similar movement of said steering wheel, for the purpose of applying the brake.

5. The combination with a vehicle wheel brake including a brake operating rod; of a steering wheel post having rotatory and axial movement, said post having a shoulder, a collar loosely mounted on said post, a rock lever, one end of said lever being connected with said collar by a sliding connection, the other end of said lever being pivotally connected with said rod, said lever being operated to transmit motion to said rod by the movement of said collar caused by the engagement of said shoulder with said collar by the axial movement of said post.

6. The combination with a vehicle wheel brake including a brake operating rod; of a steering wheel post having rotatory and axial movement, said post having a shoulder, a collar loosely mounted on said post, a rock lever, one end of said lever being connected with said collar by a sliding connection, the other end of said lever being pivotally connected with said rod, said lever being operated to transmit motion to said rod by the movement of said collar caused by the engagement of said shoulder with said collar by the axial movement of said post, and a holding and releasing device operable in conjunction with said lever.

7. The combination with an emergency brake mechanism including a rock lever; of a steering wheel post having rotatory and axial movement, a collar having relative movement on said rock lever, said collar being loosely arranged on said post, and means on said post which causes movement of said collar to move the lever to apply the brake in response to the axial movement of said post in one direction, said post having axial movement in an opposite direction without causing the movement of said collar.

8. The combination with an emergency brake mechanism including a rock lever; of a steering wheel post having rotatory and axial movement, a collar having relative movement on said rock lever, said collar being loosely arranged on said post, means on said post which causes movement of said collar to move the lever to apply the brake in response to the axial movement of said post in one direction, said post having axial movement in an opposite direction without causing the movement of said collar, and holding and releasing means operable in conjunction with said lever.

9. The combination with an emergency brake mechanism including a rock lever; of a steering wheel post having rotatory and axial movement, a collar having relative movement on said rock lever, said collar being loosely arranged on said post, means on said post which causes movement of said collar to move the lever to apply the brake in response to the axial movement of said post in one direction, said post having axial movement in an opposite direction without causing the movement of said collar, and holding and releasing means operable in conjunction with said lever, said lever being movable to release the brake when said last mentioned means is released and said post is in its normal position.

10. The combination with a steering wheel post having axial movement, and a brake, of means operable in response to the axial movement of said post to apply the brake, said means including a rock lever; and holding and releasing means automatically cooperable with said lever to keep the brake applied, said last means including a ratchet element movable with said lever, a pivoted pawl which coacts with said ratchet element, a slidable rod connected with said pawl, a spring acting on the rod to urge it in one direction to keep the pawl engaged with the ratchet element, and said rod being actuable to disengage the pawl from the ratchet element to release the first means to release the brake.

EARLE J. NICHOLSON.